Aug. 13, 1963 T. B. EDGE 3,100,475

ADAPTERS FOR MILKING SYSTEMS

Filed Oct. 5, 1961 3 Sheets-Sheet 1

INVENTOR.
THOMAS B. EDGE
BY Joseph G. Werner
ATTORNEY

Aug. 13, 1963 T. B. EDGE 3,100,475
ADAPTERS FOR MILKING SYSTEMS
Filed Oct. 5, 1961 3 Sheets-Sheet 2
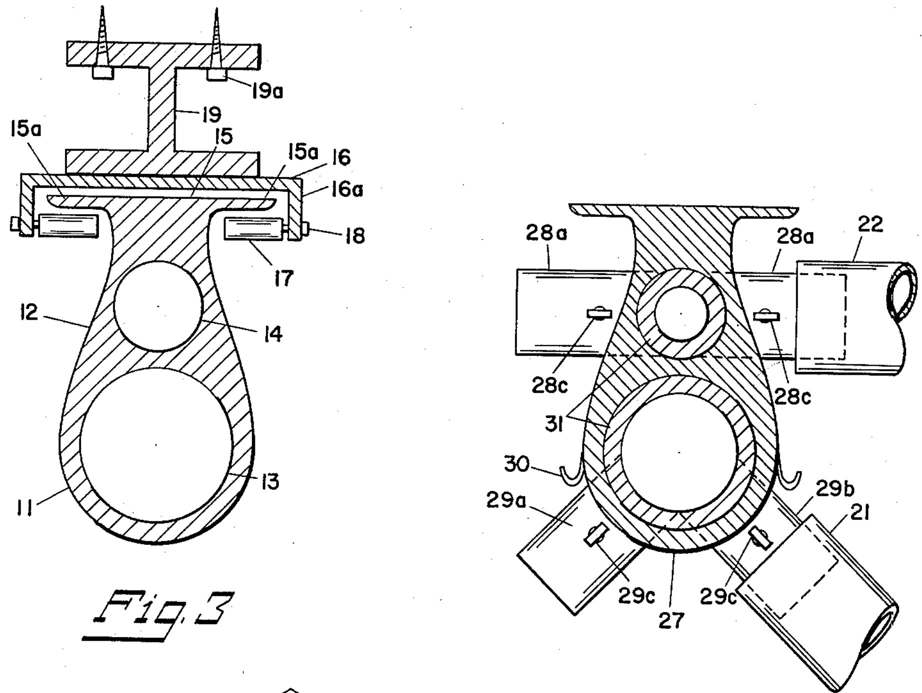
Fig. 3
Fig. 4
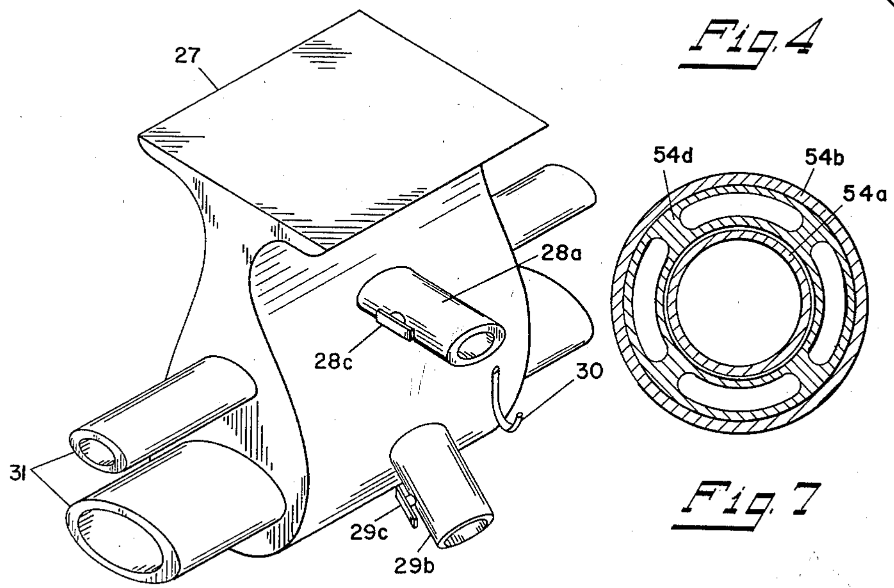
54d 54b 54a
Fig. 5
Fig. 7
INVENTOR.
THOMAS B. EDGE
BY Joseph G. Werner
ATTORNEY INVENTOR.
THOMAS B. EDGE
BY Joseph G. Werner
ATTORNEY United States Patent Office 3,100,475
Patented Aug. 13, 1963

3,100,475
ADAPTERS FOR MILKING SYSTEMS
Thomas B. Edge, Evansville, Wis.
(7483 N. 107th St., Milwaukee, Wis.)
Filed Oct. 5, 1961, Ser. No. 143,083
14 Claims. (Cl. 119—14.11)

This invention relates to improvements in liquid distribution systems, and more particularly to pipe-line milking systems.

It is a primary object of my invention to provide an adapter for transporting milk from the milking locations in the barn to the milk room which does not require time consuming attachment and detachment of individual milking units to separate pipe-line petcocks for each cow.

It is a further object of my invention to provide an inexpensive adapter for transporting milk from the milking locations in the barn to the milk room which can be used with any standard milking machine.

It is a still further object of my invention to provide an adapter for transporting milk from the milking locations in the barn to the milk room which can be easily installed by the farmer.

It is an additional object of my invention to provide an adapter for transporting milk from the milking locations in the barn to the milk room which is easily installed and removed to allow its utilization by tenant farmers who may be required to change farms.

Other objects and advantages will be apparent from the following detailed explanation taken in conjunction with the accompanying drawings wherein a preferred embodiment of the principles of the invention has been selected for exemplification.

In the drawings:

FIG. 3 is a section view of my adapter taken along section line 3—3 of FIG. 1 and drawn to an enlarged scale.

FIG. 4 is a section view of a manifold fitting for my adapter hose taken along section line 4—4 of FIG. 1 and drawn to an enlarged scale.

FIG. 5 is a perspective view of a manifold fitting for my adapter hose.

FIG. 7 is a section view of the dual-passage pipe taken along section line 7—7 of FIG. 6 and drawn to an enlarged scale.

Figure 1:
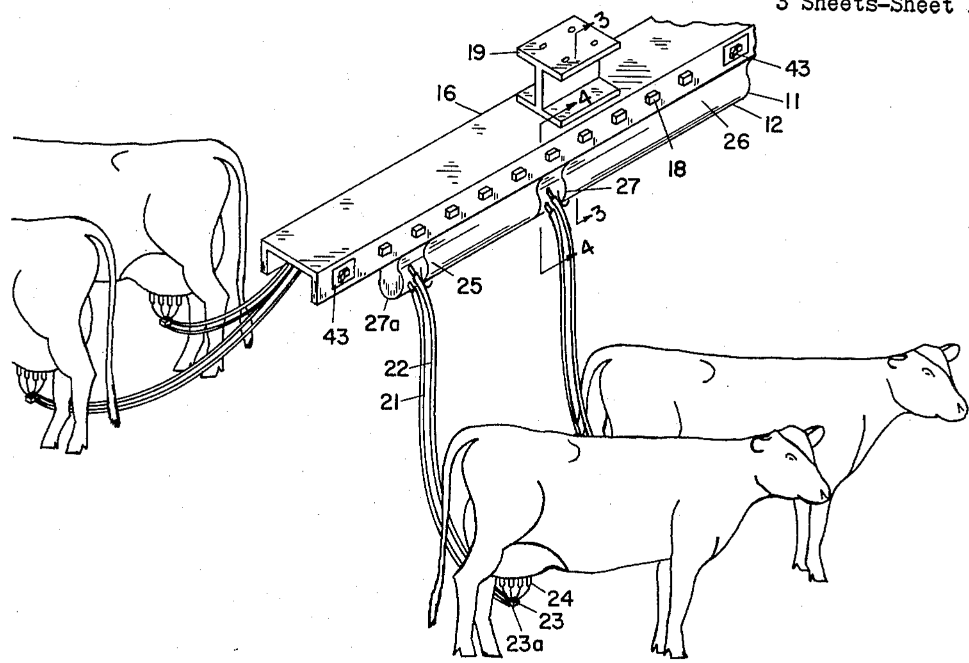
FIG. 1 is a perspective view showing a portion of my adapter hose in use.
Figure 2:
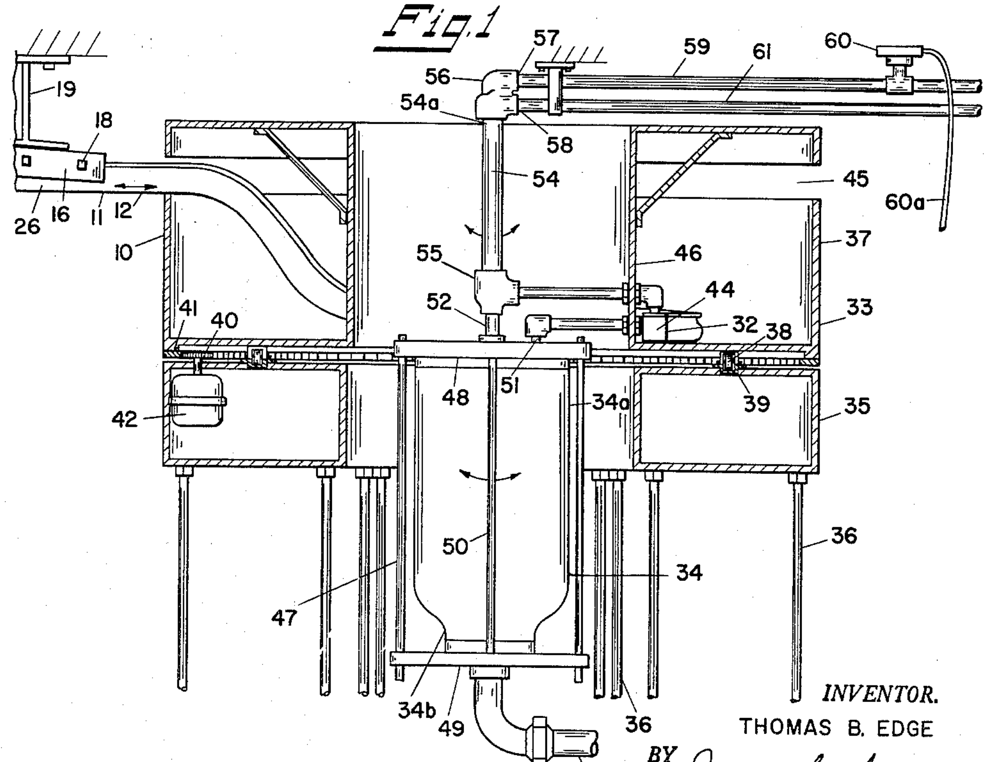
FIG. 2 is a side view of a portion of my adapter drawn to a reduced scale and showing the adapter hose attached to the hose reel which is shown in section.

Referring more particularly to the drawings in which like numbers refer to like parts, FIGS. 1 and 2 show my adapter 10 in use. My adapter 10 has an adapter hose 11 which is preferably made of plastic or some other similar material and has a transmission section 12 and a yoke section 15, shown more clearly in FIG. 3. The transmission section 12 contains a liquid passage 13 and a vacuum passage 14. The yoke section 15 is sufficiently strong to support the adapter hose 11 when in use, and preferably has shoulders 15*a* which ride on the rollers 17 of the roller track 16. The rollers 17 are maintained in position on the track channel 16*a* by roller support bolts 18. The adapter hose 11 may be moved back and forth along the track 16 as desired. The track 16 is preferably attached to the ceiling 20 or other overhead structure by means of track support brackets 19 and support bracket screws 19*a*.

Milk hoses 21 and vacuum hoses 22 are attached to the adapter hose 11 near the extension end 25, as shown in FIG. 1 and in communication with the liquid passage 13 and vacuum passage 14, respectively. The milk and vacuum hoses 21 and 22 may be attached by means of manifold fittings 27, more clearly shown in FIGS. 4 and 5, which may be inserted between sections of adapter hose 11 or at the extension end 25 of said adapter hose 11. The manifold fitting 27 preferably has a pair of vacuum hose petcocks 28*a* and 28*b* extending outward for the attachment of vacuum hoses 22, which are connected to a known type of milking claw 23 having a pulsator 23*a* and carrying standard teat cups 24. A pair of milk hose petcocks 29*a* and 29*b* extend outward for attachment of the milk hoses 21 which lead to the milking claw 23 as shown. The petcocks 28 and 29 preferably have valves 28*c* and 29*c* which may be closed when the operator so wishes. The milking claws 23 may be hung up on the claw hooks 30, located on the fittings 27, when not in use.

FIG. 5 shows that the manifold fittings 27 preferably have male connectors 31 at each end which are inserted within the liquid and vacuum passages 13 and 14 of adjacent sections of adapter hose 11 in liquid-tight and air-tight relation. As shown in FIG. 1, a modified manifold fitting 27*a* forms the end of the adapter hose 11 and does not have any male connector 31 on the end.

Connection and actuation of a vacuum pump of a usual type (not shown) in communication with the adapter hose vacuum passage 14 causes the actuation of the pulsator 23*a* which in turn causes the teat cups 24 to commence milking action in a known manner. When the adapter hose liquid passage 13 is connected to a usual type of pipe-line milk releaser, the milk will be drawn from the cows to the releaser through the milk hoses 21 and 22 and liquid passage 13.

FIG. 2 shows an additional feature of my adapter which includes a reel 33, which may be rotatably mounted with a releaser collector tank 34 to form a rotation assembly. The principal advantage of my adapter 10 from the standpoint of convenience is that the milk hose 21 and vacuum hose 22 need not be attached to and detached from the manifold fitting petcocks 28 and 29 for each cow that is milked, as is necessary with previously existing pipeline milking systems. When the cows shown in FIG. 1 are milked dry, the teat cups 24 are removed and the milker claws 23 are hooked on the milk claw hooks 30. The adapter hose 11 is then moved back along the roller track 16 until the adapter fittings 27 are positioned near the next unmilked cows and the milking process is repeated. The movement of the adapter hose 11 along the roller track 16 is quickly and easily accomplished by means of the reel 33, which may be horizontally rotatable as shown in FIG. 2.

My reel 33 has a base section 35 which may be supported by a plurality of support legs 36. The base section 35 supports the reel drum section 37, which may preferably have a plurality of support rollers 38 which ride on the base section support track 39 and support the drum section 37 in rotatable relation. The support rollers 38 are laterally restricted by the support track 39 to prevent lateral shifting of the drum section 37 with respect to the base section 35.

The drum section 37 is preferably revolved on the base section 35 by means of a pinion drive gear 40, which engages an internal drum gear 41 as shown in FIG. 2. The pinion gear 40 is driven by a motor 42 mounted on the base section 35. The motor 42 may be selectively controlled by two-way control switches 43, located at spaced intervals along the adapter hose roller track 16, as shown in FIG. 1.

The outlet end 32 of the adapter hose 11 is connected to the outlet manifold 44, which is located in fixed relation to the rotatable drum section 37. The adapter hose 11 passes out of the drum section 37 through the guide opening 45 where it is engaged by the roller track 16. The extended portion 26 of the adapter hose 11 is that portion of the hose 11 supported by the roller track 16.

In operation, the motor 42 is energized by means of the two-way control switch 43 and the reel drum section 37 is caused to rotate. Rotation of the drum section 37 in one direction causes the adapter hose 11 to slide along the roller track 16 toward the reel 33 to be wound on the drum spool 46. Rotation of the drum section 37 in the opposite direction causes the hose 11 to unwind and permits the adapter hose extension end 25 to be pulled to the end of the roller track 16 to the position shown in FIG. 1.

FIG. 2 shows my adapter 10 connected to a collector tank 34 of a known standard releaser. The collector tank 34 may be located substantially concentrically within and rotatable within the reel drum section 37 and may be supported by a tank support mounting 47. The preferred support mounting 47 has an upper bearing 48 which encompasses the collector tank inlet end 34*a* and a lower bearing 49 which encompasses the collector tank outlet end 34*b*. The upper and lower bearings 48 and 49 are connectively supported in spaced relation by support rods 50.

The adapter hose liquid passage 13 is connected to the collector tank 34 in liquid-tight relation by a collector inlet pipe 51, which passes through the drum section spool 46 in fixed relation as shown. The collector tank 34 is also rotatably connected in liquid-tight relation to a collector outlet pipe 62 which leads to a conventional releaser dumping chamber and bulk tank (not shown).

Figure 6:
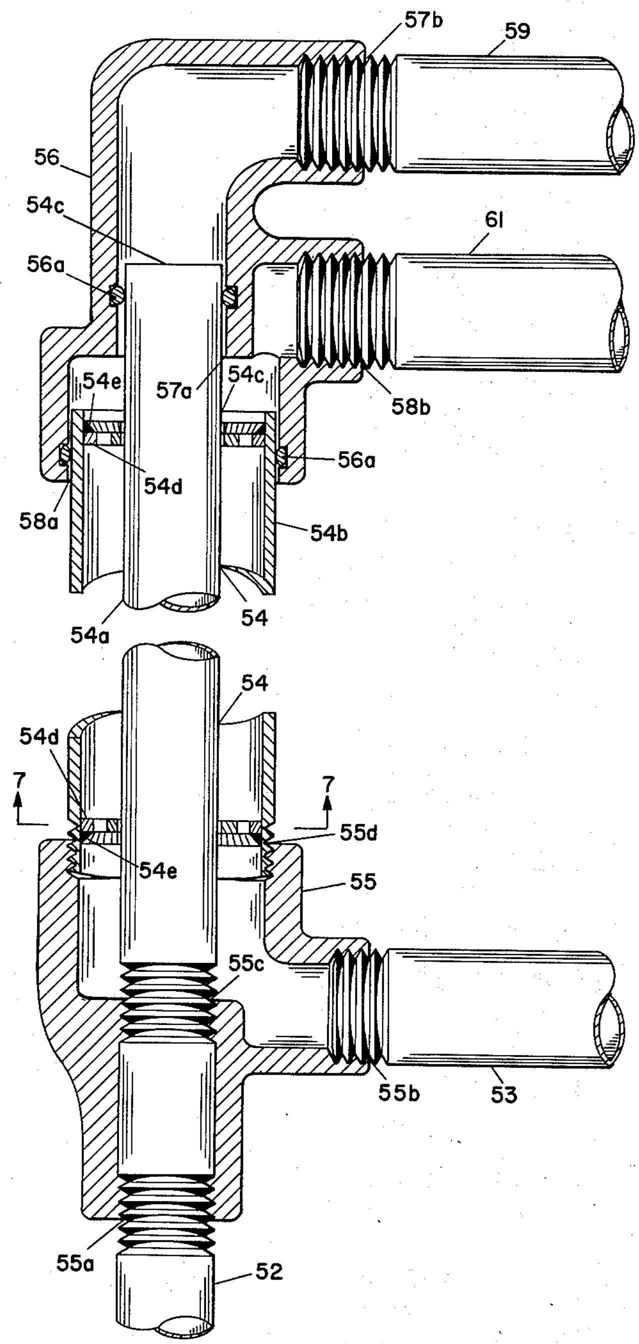
FIG. 6 is a fragmentary partial section view of the T-joint fitting, swivel connector, dual passage pipe and connected parts taken in the same direction as the side view of FIG. 2 and drawn to an enlarged scale.

The adapter hose vacuum outlet pipe 53 is connected to the adapter hose vacuum passage 14 in air-tight relation and passes through the drum section spool 46 in fixed relation as shown. The collector tank vacuum outlet pipe 52 extends upwardly from the collector tank 34 and is separately engaged with the adapter hose vacuum outlet pipe 53 by suitable combining means 54, which may include an inner pipe 54*a* and an outer pipe 54*b* and a T-joint fitting 55, as best shown in FIG. 6. The T-joint fitting preferably has a releaser inlet 55*a* threadedly engaged with the collector tank vacuum outlet pipe 52, and an adapter inlet 55*b* threadedly engaged with the adapter hose vacuum outlet pipe 53. The inner pipe 54*a* is threadedly engaged with the T-joint internal releaser outlet 55*c* in communication with the collector tank vacuum outlet pipe 52. The outer pipe 54*b* is threadedly engaged with the T-joint adapter outlet 55*d* in communication with the adapter hose vacuum outlet pipe 53. The inner and outer pipes 54*a* and 54*b* are preferably concentric and may be maintained in alignment by a plurality of ported internal guide rings 54*d* as shown in FIGS. 6 and 7. The guide rings 54*d* encompass the inner pipe 54*a* in close, guiding relation, and may be positioned within the outer pipe 54*b* by means of welds 54*e*. The inner pipe 54*a* forms the releaser passage and the outer pipe 54*b* forms the adapter passage.

The concentric pipes 54*a* and 54*b* are rotatably engaged in substantially air-tight relation by a swivel connector 56. The swivel connector 56 has a releaser inlet 57*a* which engages the inner pipe 54*a* in rotatable relation and is in communication with the releaser outlet 57*b*. The outer pipe 54*b* is rotatably engaged by the swivel connector adapter inlet 58*a*, which is in communication with the release outlet 58*b*. The swivel connector O-ring gaskets 56*a* encompass the engaged outer and inner pipes 54*a* and 54*b* to provide air-tight seals when a vacuum is produced within the inner pipe 54*a* and the outer pipe 54*b*. The releaser outlet 57 engages the releaser vacuum line 59, which has a releaser switch 60 with an attached vacuum hose 60*a* leading to the conventional dumping chamber. The adapter outlet 58 engages the adapter outlet line 61 running to the vacuum pump (not shown).

When the reel drum section 37 is rotated to wind or unwind the adapter hose 11, the rotating collector inlet pipe 51 and adapter hose vacuum outlet pipe 53 cause the collector tank 34 to rotate within the tank support upper and lower bearings 48 and 49. The inner and outer pipes 54*a* and 54*b* of the combining means 54 also rotate within the stationary, rotatably attached swivel connector 56. The release vacuum line 59 and adapter vacuum line 61 may be flexible hoses to allow for any misalignment of the pipes 54*a* and 54*b*.

It is very important to note that my adapter 10 can be used with any standard pipe line milk releaser, as well as with any standard milking machine. When the reel drum section 34 has been rotated to position the adapter hose 11 where desired, the operation of the milking system is similar to any standard pipe line milking system.

It can be seen from FIGS. 1 and 2 that the track support brackets 19 may be of different lengths to give the roller track 16 a slight downward slope toward the reel 33. This feature, combined with the positioning of the collector tank inlet pipe 51 at the bottom of the drum section spool 46 prevents any milk from remaining in the adapter hose 11 when the milking operation is finished. There is, therefore, no milk wasted with the use of my adapter.

My adapter can be cleaned with any standard in-place pipeline washing system.

In addition to use with a vacuum operated milk releaser, my adapter hose 11 and attached hose reel 33 may be used with a conventional milk pump. The operation therewith is substantially unchanged.

It is obvious that my adapter may be used to distribute other fluids besides milk and it should not be limited to milking systems.

It is understood that my invention is not confined to the particular construction and arrangement of parts herein illustrated and described, but embraces all such modified forms thereof as come within the scope of the following claims.

I claim:

1. An adapter for a liquid distribution system comprising in combination, an adapter hose having an extension end and an outlet end, said hose having a transmission section and a yoke section extending the length of said hose and being adapted to support said hose, a track adapted to support said yoke section in slidable relation, reel means engaging said adapter hose outlet end in windable relation such that as said adapter hose is wound on said reel means said yoke section is pulled along said track.

2. The invention of claim 1 wherein liquid collector means are rotatably mounted with said reel means, and wherein connector means extend from said adapter hose outlet end to said collector means.

3. An adapter for a milking system comprising in combination, an adapter hose having an extended portion with an extension end and having an outlet end, said adapter hose having a transmission section and a yoke section extending the length of said hose and being adapted to support said transmission section, said transmission section having a milk passage and a vacuum passage, a track supporting the extended portion of said yoke section in slidable relation, a reel engaging said adapter hose outlet end in windable relation such that as said adapter hose is wound on said reel said yoke section slides along said track and said adapter hose extension end approaches said reel.

4. The invention of claim 3 wherein a milk releaser collector tank with a milk inlet pipe and a vacuum outlet pipe is mounted with said reel in rotatable relation, and wherein said milk inlet pipe is engaged in communication with said milk passage outlet end.

5. The invention of claim 4 wherein combining means with an adapter passage and a substantially concentric releaser passage rotate with said reel and said collector tank, said adapter passage being in communication with said adapter hose vacuum passage and said releaser passage being in communication with said collector tank vacuum outlet pipe, and wherein a swivel connector is attached to said combining means in substantially air tight rotatable relation, said swivel connector having an adapter outlet in communication with said adapter passage and a releaser outlet in communication with said releaser passage.

6. An adapter for a milking system comprising in comprising in combination, an adapter hose having an extended portion of variable length with an extension end and having an outlet end, said adapter hose having a transmission section and a yoke section adapted to support said transmission section, said transmission section having a milk passage and a vacuum passage and having attachment means in communication with each of said passages along said adapter hose extended portion, a track engaging said yoke section in slidable relation to support said adapter hose extended portion, a reel engaging said adapter hose outlet end in windable relation whereon said adapter hose may be wound or unwound to shorten or lengthen the extended portion of said adapter hose and selectively position said attachment means, a milk releaser collector tank mounted with said reel in rotatable relation, said collector tank having a milk inlet pipe communicatively engaged with said adapter hose milk passage outlet end and having a vacuum outlet pipe, an outlet pipe rotatably connected to said collector tank in liquid-tight relation, combining means attached to said collector vacuum outlet pipe and said adapter hose vacuum passage outlet end in substantially air-tight relation, said combining means having a releaser passage in communication with said collector vacuum outlet pipe and an adapter passage in communication with said adapter hose vacuum passage, swivel means rotatably connected to said combining means in substantially air-tight relation such that as said combining means is rotated said swivel means remains stationary, a releaser vacuum line connected to said swivel means in communication with said combining means releaser passage, and an adapter vacuum line connected to said swivel means in communication with said combining means adapter passage.

7. The invention of claim 6 wherein a motor is mounted on said reel means to selectively rotate said reel means in winding and unwinding relation, and wherein said motor is controlled by means of a motor control switch.

8. An adapter hose for a liquid distribution system comprising, a transmission section having a liquid passage and a vacuum passage, a yoke section having shoulders adapted to support said adapter hose.

9. The invention of claim 8 wherein attachment means are provided near one end of said adapter hose, said attachment means being in communication with said liquid passage and said vacuum passage.

10. The invention of claim 8 wherein the attachment means consists of manifold fittings inserted between separate sections of said adapter hose, said adapter fittings having liquid passages and vacuum passages in communication with said adapter hose liquid passage and vacuum passage and having petcock engagement means whereby liquid hoses and vacuum hoses may be attached in communication with said liquid and vacuum passages.

11. In an adapter for a milking system having an adapter hose with an extension end supported in slidable relation by a track and an outlet end, said adapter hose having a vacuum passage and a liquid passage, a rotation assembly comprising in combination, a reel having a drum section mounted in rotatable relation on a base section and adapted to engage said adapter hose in windable relation, a collector tank mounted in rotatable relation with said drum section and having a milk inlet pipe and a vacuum outlet pipe, said inlet pipe passing through said drum section to connect said adapter hose liquid passage and said collector tank in liquid-tight relation, a collector outlet pipe rotatably connected to said collector tank in liquid-tight relation, combining means attached to said collector vacuum outlet pipe and said adapter hose vacuum pasage outlet end in substantially air-tight relation, said combining means having a releaser passage in communication with said collector vacuum outlet pipe and an adapter passage in communication with said adapter hose vacuum passage, swivel connector means rotatably connected to said combining means in substantially air-tight relation such that as said combining means is rotated said swivel connector means remains stationary, said swivel connector means having a releaser outlet in communication with said combining means releaser passage and an adapter outlet in communication with said combining means adapter passage.

12. The invention of claim 11 wherein said drum section is caused to rotate on said base section by a motor attached to said base section, said motor having a pinion drive gear which is engaged in drivable relation with an internal drum gear mounted on said rotatable drum section.

13. The invention of claim 11 wherein said combining means includes a T-joint fitting and a pair of substantially concentric pipes, said T-joint fitting having a releaser inlet in communication with said collector tank vacuum outlet and an adapter inlet in communication with said adapter hose vacuum passage and having substantially concentric releaser and adapter outlets, said pipes consisting of an inner pipe and an outer pipe, one of said pipes being attached to said releaser outlet in communication with said collector tank to form said releaser passage, and the other of said pipes being attached to said adapter outlet in communication with said adapter hose vacuum passage to form said adapter passage, said pipes having outlet ends separately connected to said swivel connector in air-tight rotatable relation.

14. The invention of claim 13 wherein said collector inlet pipe and said adapter hose vacuum outlet pipe cause said collector tank to rotate when said drum section is rotated.

References Cited in the file of this patent

UNITED STATES PATENTS

| | | |
|---|---|---|
| 1,746,995 | Edwards | Feb. 11, 1930 |
| 2,608,951 | Kingston | Sept. 2, 1952 |
| 2,720,217 | Vossbrinck | Oct. 11, 1955 |